United States Patent [19]

Hirai et al.

[11] Patent Number: 5,916,940
[45] Date of Patent: Jun. 29, 1999

[54] SILICONE RUBBER COMPOSITION FOR USE IN ELECTRICAL WIRE COVERING

[75] Inventors: Kazuo Hirai; Takao Matsushita, both of Chiba Prefecture, Japan

[73] Assignee: Dow Corning Toray Silicone Co., Ltd., Tokyo, Japan

[21] Appl. No.: 08/862,024

[22] Filed: May 22, 1997

[30] Foreign Application Priority Data

Jun. 27, 1996 [JP] Japan ..................................... 8-188582

[51] Int. Cl.$^6$ ....................................................... C08K 5/09
[52] U.S. Cl. ........................... 524/301; 528/24; 524/413; 524/424; 524/432; 524/399
[58] Field of Search .............................. 528/24; 524/413, 524/424, 432, 301, 399

[56] References Cited

U.S. PATENT DOCUMENTS 5,605,905  2/1997  Hirai ........................................ 524/588

FOREIGN PATENT DOCUMENTS

| 49124151 | 11/1974 | Japan . |
| 58032306 | 2/1983 | Japan . |
| 62-26124 | 2/1987 | Japan . |
| 62036462 | 2/1987 | Japan . |

OTHER PUBLICATIONS

Encyclopedia of Polymer Science and Engineering, vol. 15, Scattering to Structural Foams, John Wiley & Sons, New York, p. 273, 1989.

*Primary Examiner*—Melvyn I. Marquis
*Assistant Examiner*—Mark W. Milstead
*Attorney, Agent, or Firm*—William F. Boley; Jennifer S. Warren

[57] ABSTRACT

A silicone rubber electrical wire insulating covering formed by curing a composition comprising (A) 100 parts by weight of a polydiorganosiloxane gum, (B) 10 to 150 parts by weight of finely powdered silica, (C) 0.01 to 20 parts by weight of a zinc compound, and (D) 0.1 to 10 parts by weight of a methyl-group-substituted benzoyl peroxide. When cured the composition has good electrical insulating characteristics and does not adhere to electrical conductors.

15 Claims, No Drawings

SILICONE RUBBER COMPOSITION FOR USE IN ELECTRICAL WIRE COVERING

BACKGROUND OF INVENTION

The present invention is a silicone rubber composition for use in electrical wire covering. Specifically the present invention is a silicone rubber composition for use in electrical wire covering which provides good electrical insulation and which makes it possible to prevent bonding or adhesion between electrical conductors and the silicone rubber (hereafter referred to as "core wire adhesion") in cases where the electrical conductors, such as copper wires or tin-plated copper wires, are covered by the silicone rubber.

Silicone rubbers are superior in terms of heat resistance, cold resistance, and weather resistance and are also superior in terms of electrical insulation. Accordingly, such rubbers are widely used as electrical wire covering materials. However, silicone rubbers of this type suffer from the drawback of low mechanical strength compared to commonly used organic rubbers. Accordingly, in the case of silicone-rubber-covered electrical wires it is necessary to reinforce the covering material by installing a braided material, such as a braided glass material, on top of the silicone rubber insulating layer. Furthermore, various types of varnishes are used to tie such braided materials together. As a result, when such varnishes are cured by means of heat treatment, core wire adhesion tends to occur between the silicone rubber insulating layer and the electrical conductor. A similar phenomenon also occurs in cases where the silicone-rubber-covered electrical wire is subjected to a secondary heat treatment in order to improve the electrical characteristics.

This core wire adhesion phenomenon is an extremely important problem from the standpoint of finishing. Specifically, in the case of terminal finishing such as soldering of silicone-rubber-covered electrical wires, core wire adhesion occurs so that some silicone rubber remains on the stripped portions of the electrical conductor, thus making it impossible to complete terminal finishing. Conventionally, a method in which a composition formed by adding a fatty acid or a metal salt of a fatty acid and powdered zinc oxide to a silicone rubber composition and curing by heating with 2,4 dichlorobenzoyl peroxide has been used as a method for preventing such core wire adhesion (Japanese Patent Application Kokoku No. 62-26124). However, in this method, large quantities of the fatty acid or metal salt of a fatty acid must be added in order to prevent core wire adhesion. As a result the electrical characteristics, as typified by the electrical insulation ability, tend to drop so that the composition obtained is not always satisfactory as a silicone rubber composition for use in electrical wire covering.

Therefore, the object of the present invention is to provide a silicone rubber composition which has good electrical insulation characteristics and which also has a superior resistance to core wire adhesion.

SUMMARY OF INVENTION

The present invention is a silicone rubber composition for use in electrical wire covering comprising (A) 100 parts by weight of a polydiorganosiloxane gum described by mean formula $R_aSiO_{(4-a)/2}$, where each R is an independently selected substituted or unsubstituted monovalent hydrocarbon group and a is a value from 1.95 to 2.05, (B) 10 to 150 parts by weight of finely powdered silica, (C) 0.01 to 20 parts by weight of a zinc compound, and (D) 0.1 to 10 parts by weight of a methyl-group-substituted benzoyl peroxide. When cured the silicone rubber composition has good electrical insulating characteristics and does not adhere to electrical conductors.

DESCRIPTION OF INVENTION

The present invention is a silicone rubber composition for use in electrical wire covering comprising (A) 100 parts by weight of a polydiorganosiloxane gum described by mean formula $R_aSiO_{(4-a)/2}$, where each R is an independently selected substituted or unsubstituted monovalent hydrocarbon group and a is a value from 1.95 to 2.05, (B) 10 to 150 parts by weight of finely powdered silica, (C) 0.01 to 20 parts by weight of a zinc compound, and (D) 0.1 to 10 parts by weight of a methyl-group-substituted benzoyl peroxide.

The polydiorganosiloxane gum comprising component (A) used in the present invention is the main component of the present composition. This component (A) is described by the mean formula $R_aSiO_{(4-a)/2}$. In this formula, each R can be an independently selected monovalent hydrocarbon group, for example, an alkyl group such as methyl, ethyl, and propyl; an alkenyl group such as vinyl, allyl, butenyl, and hexenyl group; an aryl group such as phenyl; or a substituted hydrocarbon group such as 3,3,3-trifluoropropyl, 2-phenylethyl, and 2-cyanoethyl. The molecular structure of component (A) can be a linear polydiorganosiloxane structure or a linear structure with some branching. Examples of siloxy units which can be used to make up the polydiorganosiloxane include dimethylsiloxy units, vinylmethylsiloxy units, methylphenylsiloxy units, diphenylsiloxy units, vinylphenylsiloxy units, and (3,3,3-trifluoropropyl)methylsiloxy units.

In regard to the degree of polymerization of component (A), a component within the range known in the industry as a "polyorganosiloxane gum" is used; ordinarily, a component which has viscosity at 25° C. of $10^7$ mPa·s or greater and an average molecular weight of $25 \times 10^4$ or greater is used. This polydiorganosiloxane may be a homopolymer, a copolymer, or a mixture of both. The terminals of the molecular chains may be hydroxy groups, alkoxy groups, trimethylsilyl groups, dimethylvinylsilyl groups, methyldiphenylsilyl groups, vinylmethylphenylsilyl groups, or (3,3,3-trifluoropropyl)dimethylsilyl groups.

The finely powdered silica comprising component (B) is essential for providing the silicone rubber obtained by curing the composition with superior mechanical strength. Examples of finely powdered silica which can be used include dry-process silica such as fumed silica, wet-process silica such as precipitated silica, and finely powdered silica obtained by subjecting the surface of such dry- or wet-process silica to a hydrophobing treatment using an organosilicon compound such as an organosilane, organosilazane, polyorganosiloxane or polydiorganocyclosiloxane. It is desirable that the particle size of component (B) be 50 microns or smaller and that the specific surface area of this component be 50 $m^2/g$ or greater, preferably 100 $m^2/g$ or greater. If the amount of component (B) that is added to the present composition is too small the mechanical strength following curing will be insufficient. On the other hand, if the amount of component (B) added to the present composition is too large mixing with component (A) becomes difficult. Accordingly, the amount of component (B) used in the present composition is in the range of 10 to 150 parts by weight per 100 parts by weight of component (A).

The zinc compound comprising component (C) is essential for preventing core wire adhesion. Examples of compounds which can be used as component (C) include powders of inorganic zinc compounds such as zinc oxide, zinc carbonate, zinc hydroxide, zinc sulfide, and zinc selenide and fatty acid zinc compounds such as zinc stearate, zinc palmitate, zinc caprylate, zinc laurate, and zinc oleate. Among these compounds, powdered zinc oxide, powdered zinc carbonate and zinc stearate are especially desirable. In cases where powdered zinc oxide or powdered zinc carbonate is used, it is desirable that the mean particle size of the powder be 50 microns or less. The amount of component (C) that is added to the present composition is in the range of 0.01 to 20 parts by weight, preferably 0.1 to 10 parts by weight, per 100 parts by weight of component (A). The reasons for this are as follows: if the amount of component (C) that is added is less than 0.01 parts by weight, core wire adhesion following curing of the composition cannot be prevented; on the other hand, if the amount of component (C) that is added exceeds 20 parts by weight, there is no change in the desired effect, and there may be a deleterious effect on the physical properties and heat resistance of the cured silicone rubber composition.

The methyl-group-substituted benzoyl peroxide comprising component (D) used in the present invention is a curing agent which is used to cure the composition of the present invention. Component (D) in combination with the zinc compound of component (C) makes it possible to prevent core wire adhesion without lowering the electrical insulation resistance of the cured composition. Methyl-group-substituted benzoyl peroxides which can be used as component (D) include monomethylbenzoyl peroxides, dimethylbenzoyl peroxides and trimethylbenzoyl peroxides. Specific examples of such peroxides include o-methylbenzoyl peroxide, m-methylbenzoyl peroxide, p-methylbenzoyl peroxide, 2,3-dimethylbenzoyl peroxide, 2,4-dimethylbenzoyl peroxide, 2,6-dimethylbenzoyl peroxide, 2,3,4-trimethylbenzoyl peroxide, and 2,4,6-trimethylbenzoyl peroxide. In particular, o-methylbenzoyl peroxide, m-methylbenzoyl peroxide, p-methylbenzoyl peroxide, and 2,6-dimethylbenzoyl peroxide are especially desirable from the standpoints of cost and performance. Furthermore, such methyl-substituted benzoyl peroxides comprising component (D) are universally known (see Japanese Patent Application Kokoku No. 3-54138), and are commercially available.

The amount of component (D) that is added to the present composition is in the range of 0.1 to 10 parts by weight per 100 parts by weight of component (A). If the amount of component (D) added is less than 0.1 parts by weight the physical properties of the silicone rubber obtained following curing deteriorate. On the other hand, if the amount of component (D) added to the present composition exceeds 10 parts by weight the silicone rubber becomes excessively hard and such a large amount is also disadvantageous from an economic standpoint.

The composition of the present invention is a silicone rubber composition comprising components (A) through (D). In addition to these components, organosilazanes, organosilanes or polydiorganosiloxanes terminated at both ends by silanol groups, for example, may be added as anti-crepe-hardening agents if necessary. In addition, various types of additives whose use in silicone rubber compositions are conventionally known, for example, semi-reinforcing fillers such as diatomaceous earth, powdered quartz, calcium carbonate, or titanium oxide; pigments such as carbon black or iron oxide red; and heat resistance improving agents such as rare earth oxides, cerium silanolate, and cerium salts of fatty acids may also be added as long as such addition does not interfere with the object of the present invention.

The composition of the present invention can easily be manufactured by uniformly mixing the components (A) through (D). In this case, such mixing is generally accomplished by first uniformly mixing components (A) and (B) in a kneading device such as a kneader mixer or Banbury mixer. Then components (C) and (D) are mixed with this mixture by means of a kneading device such as a two-roll mill to form a silicone rubber composition consisting of components (A) through (D).

The manufacture of silicone-rubber-coated electrical wires by the application of the composition of the present invention to electrical wires is generally accomplished as follows: the composition of the present invention is introduced into a standard extrusion molding machine used for electrical wire covering and is applied as a covering to an electrical conductor, after which the electrical conductor covered by the composition of the present invention is introduced into a hot air furnace and heated for several seconds to several minutes at 200 to 500° C.

The composition of the present invention forms a silicone rubber which has good electrical insulation capacity following curing and which does not have any core wire adhesion. Accordingly, by utilizing these characteristics, the composition of the present invention can be used very effectively as a silicone rubber composition for electrical wire covering.

The present invention will be further described below in terms of practical examples and comparative examples. In the practical examples all "parts" are parts by weight. The electrical insulation resistance and core wire adhesion characteristics described in the practical examples were measured using the following methods.

Electrical insulation resistance of silicone-rubber-covered electrical wires was measured according to JIS-C-3004.

Core wire adhesion characteristics were measured by subjecting silicone-rubber-covered electrical wires to a secondary heat treatment in a furnace for 4 hours at 180 or 200° C. Following this secondary heat treatment, the silicone rubber layer on the silicon-rubber-covered electrical wires was stripped away by means of a wire stripper and the adhesion of the silicone rubber to the core wire was observed. The observations are reported as o: no core wire adhesion (no silicone rubber residue on the core wire), Δ: slight core wire adhesion (small amount of silicone rubber residue observed on the core wire) and X: core wire adhesion present (silicone rubber seen adhering to core wire; could not be stripped away).

PRACTICAL EXAMPLE 1

100 parts of a polyorganosiloxane gum terminated at both ends by vinyldimethylsiloxy groups (degree of polymerization of 5000; comprising 99.6 mol % dimethylsiloxy units and 0.4 mol % vinylmethylsiloxy units), 8 parts of a polydimethylsiloxane terminated at both ends by silanol groups (viscosity at 25° C. of 60 mPa·s), and 40 parts of a dry-process silica with a specific surface area of 200 m$^2$/g were placed in a kneader mixer, and were kneaded to a uniform consistency under heating. After this mixture was cooled, 0.5 parts of cerium oxide and 10 parts of diatomaceous earth were added to produce base compound 1. Next, silicone rubber compositions were prepared by mixing powdered zinc oxide, zinc stearate, and o-methylbenzoyl peroxide with 100 parts of the abovementioned base compound in the amounts shown in Table 1 by means of a two-roll mixer. Each of these compositions was introduced into an extruder, and was extruded to a thickness of 0.5 mm on a core wire (tin-plated copper wire) with a diameter of 1.0 mm (20 strands/0.18 mm), so that said core wire was covered. Next, the covering was molded to the shape of the electrical wire by passing the covered wire through a hot air furnace for 18 seconds at 400° C. The electrical insulation resistance values of the silicone-rubber-covered electrical wires thus obtained were measured as described in JIS-C-3004. After these silicone-rubber-covered electrical wires were subjected to secondary heat treatments for prescribed times at prescribed temperatures, the silicone rubber was stripped away by means of a wire stripper, and the adhesion of the silicone rubber to the core wire was measured. The results are provided in Table 1.

PRACTICAL EXAMPLE 2.

100 parts of a polyorganosiloxane gum terminated at both ends by vinyldimethylsiloxy groups (degree of polymerization of 5000; comprising 99.6 mol % dimethylsiloxy units and 0.4 mol % vinylmethylsiloxy units), 4 parts of a polydimethylsiloxane terminated at both ends by silanol groups (viscosity at 25° C. of 60 mpa·s) and 40 parts of dry-process silica with a specific surface area of 200 m²/g which had been surface-treated with dimethyldichlorosilane were placed in a kneader mixer and were kneaded to a uniform consistency under heating. After this mixture was cooled, 0.5 parts of cerium oxide and 10 parts of powdered quartz were added to produce base compound 2. Next, silicone rubber compositions were prepared by mixing powdered zinc oxide, zinc stearate, and p-methylbenzoyl peroxide with 100 parts of the abovementioned base compound in the amounts shown in Table 2 by means of a two-roll mill. Each of these compositions was introduced into an extruder, and was extruded to a thickness of 0.5 mm on a core wire (tin-plated copper wire) with a diameter of 1.0 mm (20 strands/0.18 mm), so that the core wire was covered. Next, the covering was cured to the shape of the electrical wire by passing the covered wire through a hot air furnace for 18 seconds at 400° C. The electrical insulation resistance values of the silicone-rubber-covered electrical wires thus obtained were measured as described in JIS-C-3004. After these silicone-rubber-covered electrical wires were subjected to secondary heat treatments for prescribed times at prescribed temperatures, the silicone rubber was stripped away by means of a wire stripper and recorded as described and the adhesion of the silicone rubber to the core wire was measured. The results are provided in Table 2.

TABLE 1.

|  |  | Present Invention | | Comparative Examples | | |
| --- | --- | --- | --- | --- | --- | --- |
|  |  | 1 | 2 | 1 | 2 | 3 |
| Base compound 1 | (parts) | 100 | 100 | 100 | 100 | 100 |
| Powdered zinc oxide | (parts) | 0.5 | — | — | 0.5 | 0.5 |
| Zinc stearate | (parts) | — | 0.5 | — | — | — |
| Calcium stearate | (parts) | — | — | — | — | 0.5 |
| o-Methylbenzoyl peroxide | (parts) | 0.7 | 0.7 | 0.7 | — | — |
| 2,4-Dichlorobenzoyl peroxide | (parts) | — | — | — | 0.7 | 0.7 |
| Insulation resistance | (MΩ km) | 12500 | 11000 | 13000 | 3500 | 5500 |
| Core wire adhesion |  |  |  |  |  |  |
| 180° C./4 hrs |  | ○ | ○ | x | ○ | O |
| 200° C./4 hrs |  | ○ | Δ | x | ○ | ○ |

TABLE 2.

|  |  | Present Invention | | Comparative Examples | | |
| --- | --- | --- | --- | --- | --- | --- |
|  |  | 1 | 2 | 1 | 2 | 3 |
| Base compound 1 | (parts) | 100 | 100 | 100 | 100 | 100 |
| Powdered zinc oxide | (parts) | 1.0 | 2.0 | 1.0 | 0.5 | 0.5 |
| Zinc stearate | (parts) | — | — | — | — | 1.0 |
| Calcium stearate | (parts) | — | — | 0.5 | 1.5 | — |
| p-Methylbenzoyl peroxide | (parts) | — | 0.7 | — | — | 0.7 |
| 2,4-Dichlorobenzoyl peroxide | (parts) | — | — | 0.7 | 0.7 | 0.7 |
| Insulation resistance | (MΩ km) | 11500 | 11000 | 2500 | 4500 | 3500 |
| Core wire adhesion |  |  |  |  |  |  |
| 180° C./4 hrs |  | ○ | ○ | ○ | ○ | ○ |
| 200° C./4 hrs |  | ○ | ○ | ○ | ○ | Δ |

We claim:

1. A silicone rubber electrical wire insulating covering formed by curing a composition comprising (A) 100 parts by weight of a polydiorganosiloxane gum described by mean formula $R_aSiO_{(4-a)/2}$, where each R is an independently selected substituted or unsubstituted monovalent hydrocarbon group, and a is a value from 1.95 to 2.05, (B) 10 to 150 parts by weight of finely powdered silica, (C) 0.01 to 20 parts by weight of a zinc compound, and (D) 0.1 to 10 parts by weight of a methyl-group-substituted benzoyl peroxide.

2. A silicone rubber electrical wire insulating covering according to claim 1, where the polydiorganosiloxane gum has a viscosity at 25° C. of $10^7$ mPa·s or greater.

3. A silicone rubber electrical wire insulating covering according to claim 1, where the finely powdered silica has a specific surface area of 50 m$^2$/g or greater.

4. A silicone rubber electrical wire insulating covering according to claim 1, where the finely powdered silica has a specific surface area of 100 m$^2$/g or greater.

5. A silicone rubber electrical wire insulating covering according to claim 1, where the zinc compound is an inorganic zinc compound selected from the group consisting of zinc oxide, zinc carbonate, zinc hydroxide, zinc sulfide, and zinc selenide.

6. A silicone rubber electrical wire insulating covering according to claim 1, where the zinc compound is an inorganic zinc compound selected from the group consisting of zinc oxide and zinc carbonate.

7. A silicone rubber electrical wire insulating covering according to claim 6, where the inorganic zinc compound is a powder having a mean particle size of 50 microns or less.

8. A silicone rubber electrical wire insulating covering according to claim 1, where the zinc compound is a fatty acid zinc compound selected from the group consisting of zinc stearate, zinc palmitate, zinc caprylate, zinc laurate, and zinc oleate.

9. A silicone rubber electrical wire insulating covering according to claim 1, where the zinc compound is zinc stearate.

10. A silicone rubber electrical wire insulating covering according to claim 1 comprising 0.1 to 10 parts by weight of the zinc compound per 100 part by weight of the polydiorganosiloxane gum.

11. A silicone rubber electrical wire insulating covering according to claim 1, where the methyl-group-substituted benzoyl peroxide is selected from the group consisting of monomethylbenzoyl peroxides, dimethylbenzoyl peroxides, and trimethylbenzoyl peroxides.

12. A silicone rubber electrical wire insulating covering according to claim 1, where the methyl-group substituted benzoyl peroxide is selected from the group consisting of o-methylbenzoyl peroxide, m-methylbenzoyl peroxide, p-methylbenzoyl peroxide, 2,3-dimethylbenzoyl peroxide, 2,4-dimethylbenzoyl peroxide, 2,6-dimethylbenzoyl peroxide, 2,3,4-trimethylbenzoyl peroxide, and 2,4,6-trimethylbenzoyl peroxide.

13. A silicone rubber electrical wire insulating covering according to claim 1, where the methyl-group substituted benzoyl peroxide is selected from the group consisting of o-methylbenzoyl peroxide, m-methylbenzoyl peroxide, p-methylbenzoyl peroxide, and 2,6-dimethylbenzoyl peroxide.

14. The silicone rubber electrical wire insulating covering according to claim 1, where the methyl-group substituted benzoyl peroxide is o-methylbenzoyl peroxide.

15. A silicone rubber electrical wire insulating covering according to claim 2, where the zinc compound is selected from the group consisting of zinc oxide, zinc carbonate, and zinc stearate and the methyl-group-substituted benzoyl peroxide is o-methylbenzoyl peroxide.

* * * * *